United States Patent
Yoshida et al.

(10) Patent No.: US 8,701,521 B2
(45) Date of Patent: Apr. 22, 2014

(54) PEDAL DEVICE FOR MOTOR VEHICLE

(75) Inventors: Shuichi Yoshida, Anjo (JP); Hideki Endo, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/789,706

(22) Filed: May 28, 2010

(65) Prior Publication Data

US 2010/0313698 A1     Dec. 16, 2010

(30) Foreign Application Priority Data

Jun. 16, 2009  (JP) ................................. 2009-143240

(51) Int. Cl.
*G05G 1/30* (2008.04)

(52) U.S. Cl.
USPC .......................................................... 74/513

(58) Field of Classification Search
USPC ............ 74/512, 513, 560; 180/271, 274, 281
See application file for complete search history.

(56) References Cited

U.S. PATENT DOCUMENTS

| | | | | |
|---|---|---|---|---|
| 5,015,104 A | * | 5/1991 | Sato | 384/296 |
| 5,385,068 A | * | 1/1995 | White et al. | 74/512 |
| 7,540,218 B2 | * | 6/2009 | Podkopayev | 74/512 |
| 2003/0019320 A1 | * | 1/2003 | Thistleton et al. | 74/560 |
| 2003/0029267 A1 | * | 2/2003 | Aoki et al. | 74/560 |
| 2005/0050980 A1 | * | 3/2005 | Park | 74/512 |
| 2009/0250285 A1 | * | 10/2009 | Allen et al. | 180/274 |

FOREIGN PATENT DOCUMENTS

| | | | |
|---|---|---|---|
| CN | 101367375 A | * | 2/2009 |
| DE | 92 17 184 U1 | | 4/1994 |
| JP | 3-67315 A | | 3/1991 |
| JP | 11105682 A | * | 4/1999 |
| JP | 2001-219828 A | | 8/2001 |
| JP | 2001-253326 A | | 9/2001 |
| JP | 2004-17698 A | | 1/2004 |
| JP | 2007-185990 A | | 7/2007 |
| KR | 2006011112 A | * | 2/2006 |

OTHER PUBLICATIONS

European Search Report mailed Jan. 27, 2012.

* cited by examiner

*Primary Examiner* — Vicky Johnson
(74) *Attorney, Agent, or Firm* — Birch, Stewart, Kolasch & Birch, LLP

(57) ABSTRACT

A pedal device includes a pedal suspended from a supporting shaft penetrating through a pair of lengthwise walls of a pedal bracket, and shaft detachment means configured to allow one end portion of the supporting shaft to be disengaged from a corresponding one of the lengthwise walls at the time of frontal collision. A pedal stroke sensor is arranged on the pedal bracket at a distance from the pedal, and the pedal stroke sensor and the pedal are connected to each other by a transmission mechanism. The transmission mechanism includes permission means for permitting the end portion of the supporting shaft to be disengaged from the corresponding lengthwise wall at the time of frontal collision.

7 Claims, 2 Drawing Sheets

PEDAL DEVICE FOR MOTOR VEHICLE

BACKGROUND OF THE INVENTION

1. Field of the Invention

The present invention relates to a pedal device used in a motor vehicle and having the function of disengaging a pedal supporting shaft from a pedal bracket at the time of a frontal collision of the vehicle.

2. Description of the Related Art

Many of automobiles (motor vehicles) are equipped with a suspended pedal device under the dash panel to allow the driver to operate the pedal device when braking or accelerating the vehicle. In many cases, the pedal device is constructed in such a manner that a supporting shaft to which a pedal arm is fastened is rotatably supported by a pedal bracket fixed to the dash panel, to allow the pedal arm to be suspended from the supporting shaft.

As such suspended pedal devices, a pedal device has been known in which, in order to ensure safety at the time of a frontal collision of the vehicle, the pedal arm is caused to disengage from the dash panel when an impact load exceeding a predetermined value is applied to the front of the vehicle during the frontal collision. Japanese Laid-open Patent Publication No. 2001-219828, for example, discloses a pedal device in which the pedal bracket is constituted by a fixed bracket secured to the dash panel and a separable bracket detachably coupled to the fixed bracket and supporting the supporting shaft. In this pedal device, when the dash panel is displaced toward the rear of the vehicle at the time of a frontal collision, the separable bracket is detached from the fixed bracket and thus from the dash panel to disengage the pedal.

Also, recently, a pedal device has been proposed in which at the time of a frontal collision, one end portion of the supporting shaft is disengaged from the pedal bracket secured to the dash panel, to allow the pedal arm to disengage while avoiding interference with devices attached to the pedal bracket or arranged around the pedal device.

Meanwhile, a pedal stroke sensor for detecting a swing of the pedal is often used with the pedal device, and techniques of electrically controlling devices on the basis of a detection signal from the pedal stroke sensor have been advanced. In electric vehicles and hybrid vehicles, for example, such a pedal stroke sensor is used to detect a swing of the brake pedal for operating a hydraulic brake apparatus, and a regenerative brake control apparatus is controlled in accordance with the pedal swing angle detected by the pedal stroke sensor, to achieve coordinated operation of the two apparatuses.

In many cases, the pedal stroke sensor is arranged near the pedal in such a manner that the axis of rotation of the pedal stroke sensor is aligned with that of the pedal, as disclosed in Japanese Laid-open Patent Publication No. 03-67315. The pedal stroke sensor has an input part engaged with the pedal so that the swing of the pedal may be transmitted to the pedal stroke sensor.

However, since numerous devices are arranged on the dashboard which is located in front of the driver's feet and to which the pedal device is attached, it is often very difficult to arrange the pedal stroke sensor in the close vicinity of the pedal.

In such cases, the pedal stroke sensor is attached to a portion of the bracket located at a distance from the pedal and is connected to the remote pedal by a transmission mechanism so that a swing of the pedal may be transmitted to the remote pedal stroke sensor through the transmission mechanism.

Also in the aforementioned pedal device which is configured to disengage one end portion of the supporting shaft, the pedal stroke sensor occasionally has to be arranged at a distance from the pedal because of various constraints. In such cases, a transmission mechanism is similarly used to transmit a swing of the pedal to the pedal stroke sensor.

In the case of the pedal device in which the bracket is allowed to be detached from the dash panel, like the one disclosed in Japanese Laid-open Patent Publication No. 2001-219828, the transmission mechanism connects the pedal stroke sensor arranged on the bracket, which is detached from the dash panel, to the pedal which also is detached from the dash panel. Accordingly, the transmission mechanism itself does not affect the disengagement of the pedal. In the case of the pedal device configured to disengage one end portion of the supporting shaft, however, the transmission mechanism connects the pedal stroke sensor, which is arranged on the pedal bracket fixed to the dash panel, to the pedal which is allowed to disengage from the pedal bracket. Thus, the transmission mechanism inevitably affects the disengaging movement of the pedal. Specifically, the individual parts of the transmission mechanism are so configured as to be movable only in their respective prespecified directions. Namely, although the transmission mechanism is capable of transmitting a swing of the pedal, it is unable to follow up change in the relative position between the pedal bracket and the pedal caused when the pedal supporting shaft disengages from the pedal bracket. As a result, the transmission mechanism hinders the disengaging movement of the supporting shaft from the pedal bracket. Thus, in the case of the pedal device configured to disengage one end portion of the supporting shaft from the pedal bracket, it is difficult to secure the pedal disengaging function where the pedal stroke sensor is arranged at a distance from the pedal.

SUMMARY OF THE INVENTION

An object of the present invention is to provide a pedal device for a motor vehicle in which, although a pedal stroke sensor is arranged at a distance from a pedal, one end portion of a supporting shaft can be reliably disengaged from a pedal bracket.

To achieve the above object, the present invention provides a pedal device for a motor vehicle, characterized by comprising: a dash panel separating an inside of a passenger compartment of the vehicle from an outside of same, the dash panel being configured to be deformed toward a rear of the vehicle when an impact load exceeding a predetermined value is applied to a front of the vehicle during a frontal collision of the vehicle; a pedal bracket attached to a panel surface of the dash panel facing the inside of the passenger compartment, the pedal bracket having a lateral wall extending along the panel surface and a pair of lengthwise walls projecting from respective opposite ends of the lateral wall into the passenger compartment; a pedal including a supporting shaft rotatably penetrating through the pair of lengthwise walls and a pedal arm suspended from the supporting shaft; and shaft detachment means configured to allow one end portion of the supporting shaft to be disengaged from a corresponding one of the lengthwise walls of the pedal bracket during the frontal collision, wherein a pedal stroke sensor for detecting a swing of the pedal is arranged on the pedal bracket at a distance from the pedal, the pedal stroke sensor and the pedal are connected to each other by a transmission mechanism for transmitting the swing of the pedal to the pedal stroke sensor, and the transmission mechanism includes permission means for permitting disengagement of the one end portion of the supporting shaft from the one lengthwise wall during the frontal collision.

Thus, in the pedal device in which the pedal and the pedal stroke sensor, which is located at a distance from the pedal, are connected to each other by the transmission mechanism, the permission means permits disengagement of the one end portion of the supporting shaft.

Specifically, the disengaging movement of the one end portion of the supporting shaft from the corresponding lengthwise wall of the pedal bracket is not hindered by the transmission mechanism but is permitted (absorbed) by the permission means, whereby the one end portion of the supporting shaft is allowed to smoothly disengage from the corresponding lengthwise wall of the pedal bracket at the time of frontal collision.

Consequently, although the pedal stroke sensor is arranged at a distance from the pedal, the function of disengaging the pedal from the pedal bracket is satisfactorily performed, making it possible to enhance safety.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to FIGS. 1 to 3.

Figure 1:
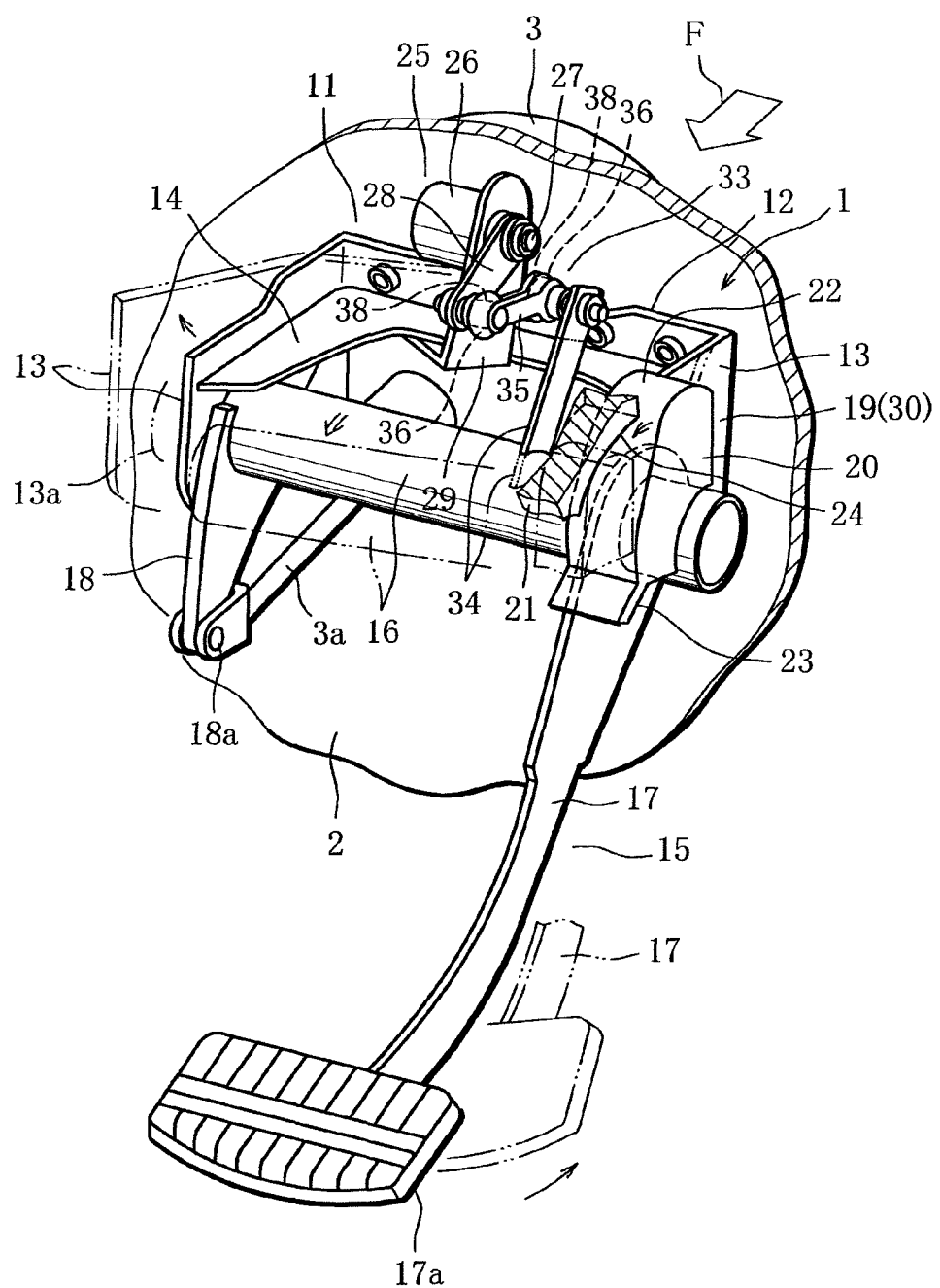
FIG. 1 is a perspective view of a pedal device according to one embodiment of the present invention.
Figure 2:
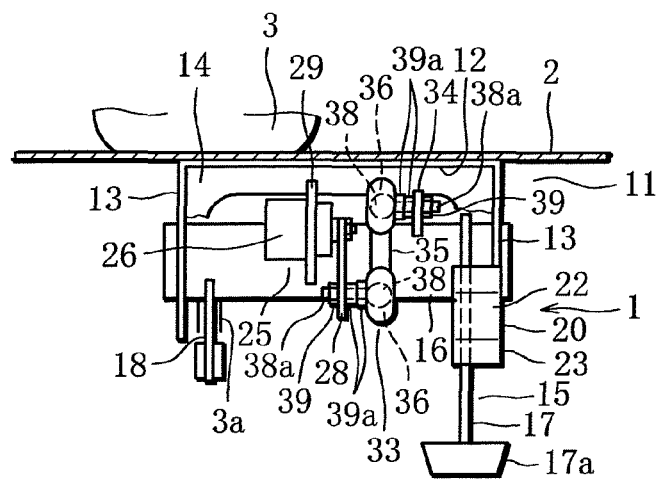
FIG. 2 is a plan view of the pedal device.

FIG. 1 is a perspective view of a brake pedal device 1 (corresponding to the pedal device of the present invention) arranged below the driver's seat of a motor vehicle, for example, an electric vehicle, and FIG. 2 is a plan view of the pedal device 1.

As illustrated in FIGS. 1 and 2, the electric vehicle has a dash panel 2 located at the foremost part of a passenger compartment thereof (the dash panel is a member separating the interior of the passenger compartment from outside). A booster 3 (only part thereof is shown), which is a hydraulic brake apparatus for applying braking force to individual wheels of the vehicle, is fixed to a lower portion of the panel surface of the dash panel 2 opposite the passenger compartment. The booster 3 is arranged in a position slightly offset from the center of the driver's seat toward the front passenger's seat, so as not to interfere with, for example, various devices arranged on the dash panel 2. An operating rod 3a of the booster 3 penetrates through the dash panel 2 into the passenger compartment, and the pedal device 1 is attached to that panel surface of the dash panel 2 which faces the vehicle compartment and from which the operating rod 3a projects.

The pedal device 1 will be now described in detail. Reference numeral 11 denotes a pedal bracket, 15 denotes a brake pedal (corresponding to the pedal of the present invention), and 25 denotes a pedal stroke sensor.

The pedal bracket 11 has, for example, a lateral wall 12 made of a metal plate and extending along the inside panel surface of the dash panel 2, a pair of lengthwise walls 13 each made of a metal plate and projecting from the respective opposite ends of the lateral wall 12, located widthwise of the vehicle, into the passenger compartment, and a reinforcing member 14 attached to the inner surfaces of upper portions of the lateral and lengthwise walls 12 and 13. The lateral wall 12 and the front ends of the lengthwise walls 13 are fixed to the dash panel 2 by using screws, for example.

The brake pedal 15 includes a supporting shaft 16 constituted by a pipe member, for example, a pedal arm 17 attached to one end portion of the supporting shaft 16 and suspended from the supporting shaft 16, a foot pad 17a attached to a lower end of the pedal arm 17, and a lever 18 (bracket) attached to the other end portion of the supporting shaft 16 opposite the pedal arm 17 and coupled to the booster 3. The supporting shaft 16 is inserted through shaft insertion holes formed in the respective lengthwise walls 13 and rotatably supported by the walls 13. Out of the two end portions of the supporting shaft 16, the left end portion as viewed in the figures is detachably supported by the left lengthwise wall 13.

The pedal arm 17 is located so as to correspond in position to the pedal operating foot of the driver seated on the driver's seat. Specifically, the pedal arm 17 is located close to, for example, adjacent to the right lengthwise wall 13. On the other hand, the lever 18 is located so as to correspond in position to the booster 3. Specifically, the lever 18 is located close to, for example, adjacent to the left lengthwise wall 13 (offset toward the front passenger's seat). Namely, out of the pedal arm 17 and the lever 18, only the pedal arm 17 is located close to the driver's foot. The lever 18, which is offset toward the front passenger's seat, is pivotally coupled, by a pin 18a, to the distal end of the operating rod 3a projecting into the passenger compartment. Thus, when the foot pad 17a of the brake pedal 15 is depressed, the swing of the pedal arm 17 is transmitted through the supporting shaft 16 and the lever 18 to the booster 3, which then produces a hydraulic pressure needed for braking.

As illustrated in FIG. 1, the right lengthwise wall 13 is provided with a rearward displacement restriction structure 19 for restricting rearward displacement of the brake pedal 15 at the time of a frontal collision of the vehicle. The rearward displacement restriction structure 19 is constituted by the combination of, for example, a butt member 20 made of a metal plate and attached to an upper portion of the right lengthwise wall 13, and a guide member 21 made of a metal plate and attached to a vehicle body component arranged above and rearward of the pedal device 1, for example, a dash cross member (not shown).

Specifically, the butt member 20 has a protuberance 22 protruding from an upper portion thereof toward a position under the guide member 21, and a pedal presser 23 formed at a lower portion thereof and disposed for contact with the pedal arm 17.

The guide member 21 has an arcuate guide surface 24 formed at a lower portion thereof and extending gradually downward from a position corresponding to the distal end of the protuberance 22. Thus, when an impact load exceeding a predetermined value is applied to the front of the vehicle and the dash panel 2 and thus the butt member 20 are displaced toward the rear of the vehicle, the protuberance 22 of the butt member 20 butts against the guide surface 24, so that the protuberance 22 is acted upon by a downward external force. As a result, the protuberance 22 moves downward while deforming the upper portion of the right lengthwise wall 13, and the pedal presser 23, which also moves downward, presses the pedal arm 17 from the rear side of the vehicle, thereby restricting the displacement of the brake pedal 15 toward the rear of the vehicle.

The rearward displacement restriction structure 19 serves also as a shaft detachment structure 30 (corresponding to the shaft detachment means of the present invention) which allows the left end portion (one end portion) of the supporting shaft 16 to be detached from the left lengthwise wall 13 (corresponding to the one lengthwise wall of the present invention) at the time of a frontal collision of the vehicle. Specifically, although the displacement of the right lengthwise wall 13 toward the rear of the vehicle is restricted by the guide member 21, rearward displacement of the left lengthwise wall 13 is not restricted. Consequently, the lateral wall 12 between the right and left lengthwise walls 13 is bent at an intermediate portion thereof due to change in the relative position between the two lengthwise walls 13, so that the left lengthwise wall 13 is displaced in a direction (expanding direction) away from the right lengthwise wall 13. Because of this displacement, the left end portion of the supporting shaft 16 of the pedal device 1 comes out of the shaft insertion hole 13a of the left lengthwise wall 13. Needless to say, the individual parts of the pedal bracket 11 and of the rearward displacement restriction structure 19 are so configured as to permit the disengagement of the supporting shaft 16.

The pedal stroke sensor 25 is a sensor for detecting the swing angle of the brake pedal 15. The pedal stroke sensor 25 has a rotary type sensor body 26, and a rotatable input shaft 27 is attached to one end of the sensor body 26 to be input with the pedal swing. A sensor arm 28 (corresponding to the input arm of the present invention) is pivotally coupled to the input shaft 27. When the sensor arm 28 swings, the swing is input to the sensor body 21 through the input shaft 27, whereby the pedal swing angle is detected by the sensor body 26.

In order to avoid interference with various devices (not shown) arranged around the pedal device 1, the pedal stroke sensor 25 is arranged not in the vicinity of the brake pedal 15, but at a distance from the brake pedal 15, in the illustrated embodiment, at an intermediate position between the brake pedal 15 and the lever 18. The pedal stroke sensor 25 is supported on the pedal bracket 11 by means of a sensor fixing bracket 29 secured, for example, to the reinforcing member 14. Specifically, the pedal stroke sensor 25 is positioned with its axis of rotation extending substantially parallel with that of the supporting shaft 16 so that the swing of the brake pedal 15 may be easily transmitted to the pedal stroke sensor 25.

The pedal stroke sensor 25 is connected to a regenerative brake control apparatus (not shown) mounted on the electric vehicle and supplies the regenerative brake control apparatus with a signal indicative of the pedal swing angle detected thereby.

The pedal stroke sensor 25 and the brake pedal 15, which are located at a distance from each other as stated above, are coupled together by a transmission mechanism, for example, a link mechanism 33.

As illustrated in FIGS. 1 and 2, the link mechanism 33 has a structure in which, for example, an arm 34 (corresponding to the output arm of the present invention) projecting from the outer peripheral surface of the supporting shaft 16 and located close to the input shaft 27 and the sensor arm 28 radially projecting from the input shaft 27 are pivotally coupled to each other by a straight link rod 35 (corresponding to the link member of the present invention). In an initial state of the brake pedal 15, for example, the arm 34, which extends in the length direction of the pedal arm 17, is obliquely directed and located on the front side of the vehicle, while the sensor arm 28 obliquely extends in a direction opposite to that in which the arm 34 extends, and is located on the rear side of the vehicle.

The link rod 35, which connects the sensor arm 28 and the arm 34 to each other, has ball joints 36 provided at respective opposite ends thereof. Each ball joint 36 has a spherical portion 38, as a main body, rotatably buried in the side surface of the corresponding end portion of the link rod 35, and a connecting screw shank 38a extending from the spherical portion 38 (to be connected to a mating member). The ball joints 36 are disposed such that the screw shanks 38a project outward from the respective side surfaces of the link rod 35 in opposite directions. The screw shanks 38a are fixed to the distal ends of the arms 28 and 34, respectively, by means of elastically deformable collars 39a and nuts 39 (fixing members) and constitute part of the link mechanism 33 for transmitting the swing of the brake pedal 15 to the pedal stroke sensor 25 located at a distance from the pedal 15.

Since the ball joints 36 permit free angular relative movement, the link rod 35 of the link mechanism 33 is allowed to assume any orientation in the longitudinal direction of the vehicle as well as in the vertical direction while following up the disengaging movement of the left end portion of the supporting shaft 16 from the left lengthwise wall 13. Namely, the ball joints 36 connecting the link rod 35 to the respective arms 28 and 34 serve not only to transmit a swing of the pedal through the link mechanism 33 but to permit the disengagement of the left end portion of the supporting shaft 16 from the left lengthwise wall 13 (corresponding to the permission means of the present invention).

In the pedal device 1 constructed as described above, as the foot pad 17a is depressed to brake the vehicle and thus the pedal arm 17 is swung about the supporting shaft 16, the lever 18 turns to operate the booster 3, so that a hydraulic pressure needed for braking is produced to exert a braking force. At this time, the swing of the pedal arm 17 is transmitted from the arm 34 of the supporting shaft 16 to the sensor arm 28 through the link rod 35. Based on the swing thus transmitted, the pedal stroke sensor 25 detects the swing angle of the brake pedal 15, and the regenerative brake control apparatus (not shown) is controlled in accordance with the detection signal from the pedal stroke sensor 25, to apply regenerative brake to the electric vehicle.

Figure 3:
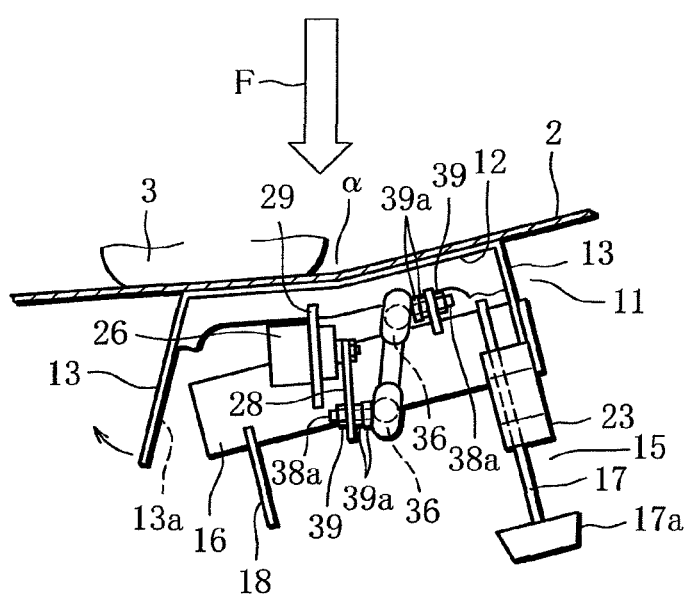
FIG. 3 is a plan view of the pedal device whose pedal supporting shaft is disengaged due to a frontal collision of a vehicle.

If an impact load exceeding the predetermined value is applied to the front of the vehicle at the time of a frontal collision of the vehicle, as indicated by arrow F in FIGS. 1 and 3, the dash panel 2 is pushed by the booster 3 and the engine (not shown) located in front of the dash panel 2 and is deformed toward the rear of the vehicle. As the dash panel 2 is deformed in this manner, the pedal bracket 11 is displaced toward the rear of the vehicle.

Since the guide member 21 secured to the dash cross member (not shown) is located in the close vicinity of the protuberance 22 on the rear side of the vehicle, the protuberance 22 butts against the arcuate guide surface 24 of the guide member 21 when the pedal bracket 11 is displaced toward the rear of the vehicle, so that the protuberance 22 is applied with a downward external force. The upper portion of the right lengthwise wall 13 is lower in rigidity than the guide member 21 fixed to the dash cross member, and therefore, the protuberance 22 slides downward along the arcuate guide surface 24 while deforming the right lengthwise wall 13. As the protuberance 22 is thus displaced downward, the pedal presser 23 presses the pedal arm 17 from the rear side of the vehicle toward the front of same. Consequently, the brake pedal 15 is swung toward the front of the vehicle, restricting the rearward displacement of the pedal 15. In FIG. 1, dot-dot-dash lines indicate the state of the pedal arm 17 of which the movement toward the rear of the vehicle is restricted.

On the other hand, the rearward displacement of the left-hand side (front passenger's seat side) of the pedal bracket 11 is not restricted, unlike the right-hand side of same, and thus, the left-hand side of the pedal bracket 11 is displaced more rearward of the vehicle than the right-hand side of same. Consequently, the lateral wall 12 is bent at an intermediate portion thereof, as illustrated in FIG. 3, due to change in the relative position between the right- and left-hand sides of the pedal bracket 11 in the longitudinal direction of the vehicle. In the figure, α indicates the bent portion of the pedal bracket 11. As the lateral wall 12 is deformed in this manner, the left lengthwise wall 13 is displaced outward about the corner between the lateral wall 12 and the left lengthwise wall 13, as indicated by dot-dot-dash lines in FIG. 1 and in FIG. 3, due to the deformation of the lateral wall 12. Namely, the left lengthwise wall 13 is displaced in a direction away from the right lengthwise wall 13. As a result, the left end portion of the supporting shaft 16 comes out of the shaft insertion hole 13a of the left lengthwise wall 13, as indicated by the dot-dot-dash line in FIG. 1 and in FIG. 3, so that the brake pedal 15 is disengaged.

The pedal stroke sensor 25 is attached to the pedal bracket 11 fixed to the dash panel 2, and the arm 34 is connected to the brake pedal 15 which is allowed to disengage from the pedal bracket 11. Accordingly, if the link mechanism 33 is constituted by a transmission mechanism that merely connects the pedal stroke sensor 25 and the brake pedal 15 to each other, the individual parts of the transmission mechanism are unable to follow up change in the relative position of the members when the supporting shaft 16 is disengaged from the left lengthwise wall 13, because the parts of the transmission mechanism can move only in their respective prespecified directions. Such a transmission mechanism therefore hinders the disengaging movement of the supporting shaft 16, namely, the brake pedal 15.

The transmission mechanism used in this embodiment, on the other hand, has the permission structure that permits the supporting shaft 16 to be relatively displaced in the detachment direction (disengaging direction), that is, the link mechanism 33 has the ball joints 36 arranged between the respective connecting members. Accordingly, the link rod 35 of the link mechanism 33 is allowed to assume any orientation by the spherical portions 36a of the ball joints 36, as illustrated in FIG. 3, and can follow up the movement of the supporting shaft 16 separating from the left lengthwise wall 13 as well as from the lateral wall 12. Namely, the change in the relative position between the pedal bracket 11 and the brake pedal 15 is absorbed by the ball joints 36. Thus, the detaching movement of the supporting shaft 16 from the left lengthwise wall 13, that is, the disengaging movement of the supporting shaft 16 is not hindered. The supporting shaft 16 of the brake pedal 15 can therefore be smoothly disengaged from the left lengthwise wall 13 of the pedal bracket 11.

Thus, even though the pedal device 1 is configured such that the pedal stroke sensor 25 is located at a distance from the brake pedal 15, the function of disengaging the brake pedal 15 from the pedal bracket 11 can be satisfactorily performed, thus ensuring safety. In particular, the supporting shaft 16 is allowed to disengage from the left lengthwise wall 13 by using the rearward displacement restriction structure 19, and accordingly, the disengagement of the supporting shaft 16 can be reliably achieved without regard to the constraints imposed by the individual parts of the rearward displacement restriction structure 19 and the mounting position of the pedal stroke sensor 25.

Also, the link mechanism 33, which uses the ball joints 36 to absorb change in the relative position between the pedal bracket 11 and the brake pedal 15, is not only simple in structure but is capable of following up any behavior of the supporting shaft 16.

This link structure is especially useful for the brake pedal device 1 which is used in an electric vehicle or a hybrid vehicle and thus under various constraints where the brake pedal 15 for the hydraulic brake and the pedal stroke sensor 25 for the regenerative brake control are both attached to the pedal bracket 11.

The present invention is not limited to the foregoing embodiment alone and may be modified in various ways without departing from the scope of the invention.

For example, in the above embodiment, the ball joints are exemplified as the permission means for permitting the disengagement of one end portion of the supporting shaft from the pedal bracket. The permission means is, however, not limited to ball joints and some other type of permission means with a different structure may be used instead. Ball joints are used in the above embodiment because a link mechanism is used as the transmission mechanism. Where the transmission mechanism is constituted by a different type of mechanism, the permission means with a suitably modified structure may be used.

Also, in the above embodiment, the present invention is applied to the brake pedal device but may alternatively be applied to other pedal devices such as an accelerator pedal device.

What is claimed is:

1. A pedal device for a motor vehicle, comprising:
    a dash panel separating an inside of a passenger compartment of the vehicle from an outside of same, the dash panel being configured to be deformed toward a rear of the vehicle when an impact load exceeding a predetermined value is applied to a front of the vehicle during a frontal collision of the vehicle;
    a pedal bracket attached to a panel surface of the dash panel facing the inside of the passenger compartment, the pedal bracket having a lateral wall extending along the panel surface and a pair of lengthwise walls projecting from respective opposite ends of the lateral wall into the passenger compartment;
    a pedal including a supporting shaft rotatably penetrating through the pair of lengthwise walls and a pedal arm suspended from the supporting shaft; and
    shaft detachment means configured to allow one end portion of the supporting shaft to be disengaged from a corresponding one of the lengthwise walls of the pedal bracket during the frontal collision while maintaining an opposite end portion of the supporting shaft being supported by the other of the pair of lengthwise walls of the pedal bracket, wherein:
    a pedal stroke sensor for detecting a swing of the pedal is arranged on the pedal bracket at a distance from the pedal,
    the pedal stroke sensor and the pedal are connected to each other by a transmission mechanism for transmitting the swing of the pedal to the pedal stroke sensor, the transmission mechanism includes permission means for permitting disengagement of the one end portion of the supporting shaft from the one lengthwise wall during the forward collision,
the shaft detachment means includes a butt member attached to the other of the pair of lengthwise walls and a guide member attached to the passenger compartment, such that, during the frontal collision, the guide member makes contact with the butt member and forces the guide member in a downward direction,
wherein the transmission mechanism is constituted by a link mechanism including an output arm projecting from an outer peripheral surface of the supporting shaft, an input arm connected to an input part of the pedal stroke sensor, and a link member connecting the output and input arms to each other, and
the permission means includes ball joints relatively movably connecting the link member and the input and output arms of the link mechanism.

2. The pedal device according to claim 1, wherein:
the shaft detachment means has a rearward displacement restriction structure for restricting displacement of the other lengthwise wall of the pedal bracket toward the rear of the vehicle during the frontal collision, to restrict rearward displacement of the pedal arm, and is configured such that the one lengthwise wall is displaced in a direction away from the other lengthwise wall due to deformation of the lateral wall caused by change in relative position between the pair of lengthwise walls, to allow the one end portion of the supporting shaft to be disengaged from the one lengthwise wall.

3. The pedal device according to claim 1, wherein:
the pedal is a brake pedal for operating a hydraulic brake apparatus, and
the pedal stroke sensor is configured to output a control signal to a regenerative brake control apparatus.

4. A pedal device for a motor vehicle, comprising:
a dash panel separating an inside of a passenger compartment of the vehicle from an outside of same, the dash panel being configured to be deformed toward a rear of the vehicle when an impact load exceeding a predetermined value is applied to a front of the vehicle during a frontal collision of the vehicle;
a pedal bracket attached to a panel surface of the dash panel facing the inside of the passenger compartment, the pedal bracket having a lateral wall extending along the panel surface and a pair of lengthwise walls projecting from respective opposite ends of the lateral wall into the passenger compartment;
a pedal including a supporting shaft rotatably penetrating through the pair of lengthwise walls and a pedal arm suspended from the supporting shaft; and
shaft detachment means configured to allow one end portion of the supporting shaft to be disengaged from a corresponding one of the lengthwise walls of the pedal bracket during the frontal collision, wherein:
a pedal stroke sensor for detecting a swing of the pedal is arranged on the pedal bracket at a distance from the pedal,
the pedal stroke sensor and the pedal are connected to each other by a transmission mechanism for transmitting the swing of the pedal to the pedal stroke sensor, and
the transmission mechanism includes permission means for permitting disengagement of the one end portion of the supporting shaft from the one lengthwise wall during the forward collision, wherein:
the transmission mechanism is constituted by a link mechanism including an output arm projecting from an outer peripheral surface of the supporting shaft, an input arm connected to an input part of the pedal stroke sensor, and a link member connecting the output and input arms to each other, and
the permission means includes ball joints relatively movably connecting the link member and the input and output arms of the link mechanism.

5. The pedal device according to claim 4, wherein:
the pedal is a brake pedal for operating a hydraulic brake apparatus, and
the pedal stroke sensor is configured to output a control signal to a regenerative brake control apparatus.

6. A pedal device for a motor vehicle, comprising:
a dash panel separating an inside of a passenger compartment of the vehicle from an outside of same, the dash panel being configured to be deformed toward a rear of the vehicle when an impact load exceeding a predetermined value is applied to a front of the vehicle during a frontal collision of the vehicle;
a pedal bracket attached to a panel surface of the dash panel facing the inside of the passenger compartment, the pedal bracket having a lateral wall extending along the panel surface and a pair of lengthwise walls projecting from respective opposite ends of the lateral wall into the passenger compartment;
a pedal including a supporting shaft rotatably penetrating through the pair of lengthwise walls and a pedal arm suspended from the supporting shaft; and
shaft detachment means configured to allow one end portion of the supporting shaft to be disengaged from a corresponding one of the lengthwise walls of the pedal bracket during the frontal collision, wherein:
a pedal stroke sensor for detecting a swing of the pedal is arranged on the pedal bracket at a distance from the pedal,
the pedal stroke sensor and the pedal are connected to each other by a transmission mechanism for transmitting the swing of the pedal to the pedal stroke sensor, and
the transmission mechanism includes permission means for permitting disengagement of the one end portion of the supporting shaft from the one lengthwise wall during the forward collision, wherein:
the shaft detachment means has a rearward displacement restriction structure for restricting displacement of the other lengthwise wall of the pedal bracket toward the rear of the vehicle during the frontal collision, to restrict rearward displacement of the pedal arm, and is configured such that the one lengthwise wall is displaced in a direction away from the other lengthwise wall due to deformation of the lateral wall caused by change in relative position between the pair of lengthwise walls, to allow the one end portion of the supporting shaft to be disengaged from the one lengthwise wall,
the shaft detachment means includes, a butt member attached to the other lengthwise wall, and a guide member attached to the passenger compartment, such that, during the frontal collision, the guide member makes contact with the butt member and forces the guide member in a downward direction, and
the shaft detachment means further includes a pedal presser extending from the butt member along a rear end surface the pedal arm that faces a passenger compartment, the pedal presser restricts a rearward displacement of the pedal arm as the guide member moves downward to restrict in a rearward movement of the pedal.

7. The pedal device according to claim 6, wherein:
the pedal is a brake pedal for operating a hydraulic brake apparatus, and
the pedal stroke sensor is configured to output a control signal to a regenerative brake control apparatus.

* * * * *